April 8, 1924.   1,489,822

J. P. CROWLEY

METHOD AND APPARATUS FOR DRAWING WIRE GLASS

Filed Feb. 4, 1921   2 Sheets-Sheet 1

INVENTOR
Joseph P. Crowley
BY C.A. Crowley
ATTORNEY

April 8, 1924.

J. P. CROWLEY 1,489,822

METHOD AND APPARATUS FOR DRAWING WIRE GLASS

Filed Feb. 4, 1921     2 Sheets-Sheet 2

INVENTOR
Joseph P. Crowley
BY C. A. Rowley
ATTORNEY

Patented Apr. 8, 1924.

1,489,822

UNITED STATES PATENT OFFICE.

JOSEPH P. CROWLEY, OF TOLEDO, OHIO, ASSIGNOR TO THE LIBBEY-OWENS SHEET GLASS COMPANY, OF TOLEDO, OHIO, A CORPORATION OF OHIO.

METHOD AND APPARATUS FOR DRAWING WIRE GLASS.

Application filed February 4, 1921. Serial No. 442,360.

*To all whom it may concern:*

Be it known that I, JOSEPH P. CROWLEY, a citizen of the United States, residing at Toledo, in the county of Lucas and State of Ohio, have invented new and useful Improvements in Methods and Apparatus for Drawing Wire Glass, of which the following is a specification.

This invention relates to a new method and apparatus for making wire-glass, that is, sheet glass having a layer of wire mesh embedded within its thickness to strengthen the same and hold together the pieces of a sheet of glass when shattered.

It is the object of the present invention to set forth a new system of continuously producing this wire-glass by a drawing process, so that the drawn sheet will have smooth fire-polished surfaces and need no subsequent grinding or polishing.

The invention will be clearly understood from the following detailed description of an approved form of apparatus for carrying out this drawing process.

Figure 1:
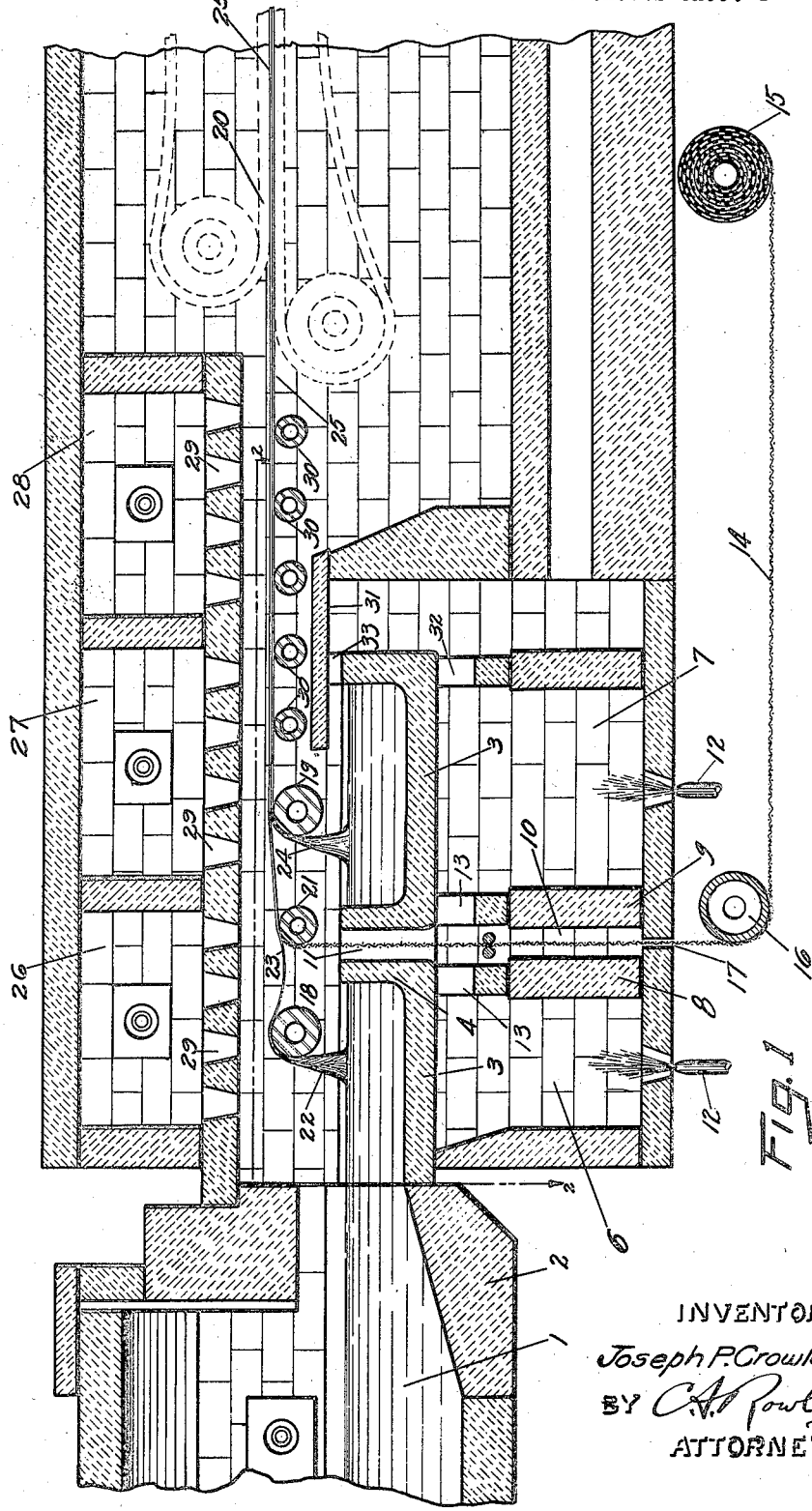
Fig. 1 is a vertical longitudinal section through the apparatus.
Figure 2:
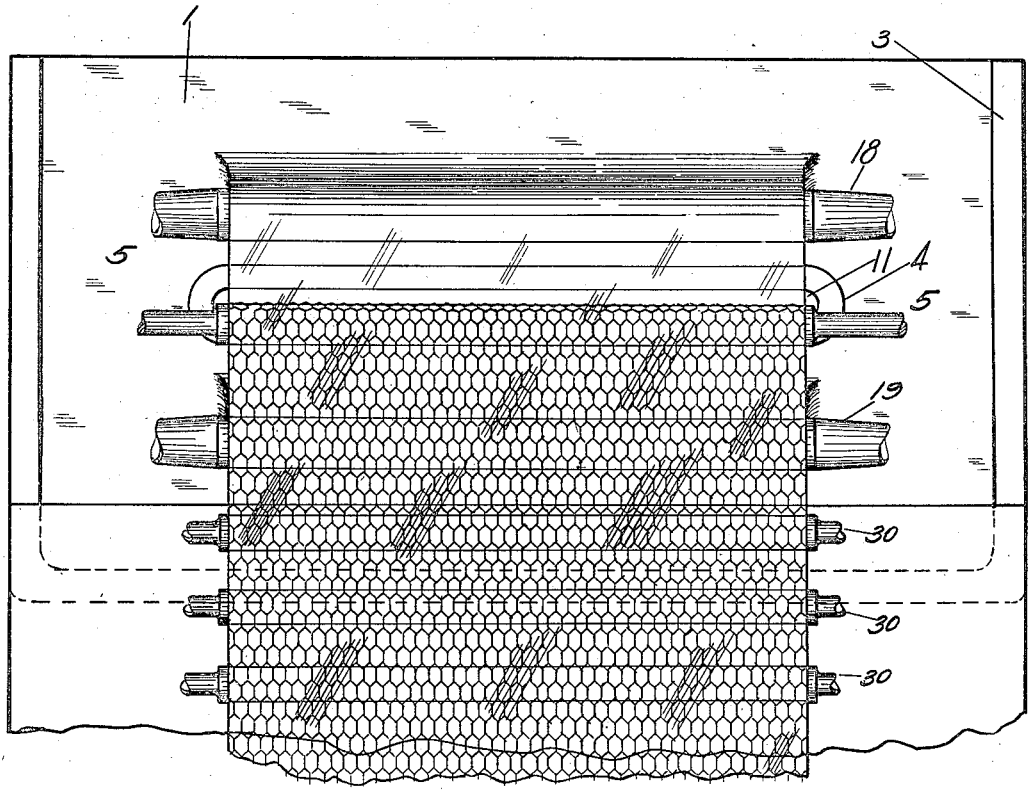
Fig. 2 is a partial horizontal section, taken substantially on the line 2—2 of Fig. 1.

Referring first to the form shown in Figs. 1 and 2, the molten glass 1 flows continuously from the discharge end 2 of a continuous tank furnace into the draw-pot or receptacle 3. This pot 3 has at an intermediate point an upwardly projecting nozzle or slotted partition 4, lying crosswise to the flow of glass, and of less length than the width of the pot, so that a flow of molten glass to the far end of the pot is maintained around the ends of the slotted projection as shown at 5, 5. Below the drawing pot are heating chambers 6 and 7 separated by partitions 8, 9, between which is a narrow chamber 10 communicating at the top with the slot 11 of the member 4. Any suitable burners such as 12, supply heat to the chambers 6 and 7, and connecting passages 13, allow heated gases to pass through the partitions 8 and 9, and up through the slot 11. A sheet of wire mesh 14, drawn from a supply roll 15, and of a width corresponding to the width of the sheet of wire-glass to be produced, is led around guide roller 16, through slot 17, in the bottom of the heating chambers, and up through chamber 10 and slot 11, wherein it becomes heated to a temperature comparable with that of the molten glass in the receptacle 3.

Mounted crosswise of the apparatus and spaced a short distance above the molten masses of glass at either side of the slotted member 4, are a pair of parallel horizontal metallic rollers 18 and 19. These rollers are each internally cooled to a considerable extent, by air, water or other fluid, and may be either idler rolls or driven by any suitable means, not shown, at a speed preferably somewhat less than that of the sheet drawing mechanism, indicated conventionally at 20. Between the rollers 18 and 19 and parallel therewith, is a third roller 21, which serves as a guide to feed in the wire mesh 14. The roller 21 is also cooled and may be driven if desired.

A mass of molten glass 22 is drawn up over the roller 18, from which it is stretched off in the form of a thin sheet 23 in a horizontal direction. This sheet will have a tendency to sag, and while in a soft and highly heated condition will lay on, and pass over the feed roller 21, over which the wire mesh passes, the wire mesh sinking into and adhering closely to the lower face of the sheet 23. A second mass of molten glass 24 is drawn up over the other cooled roller 19, and is drawn in between this roller and the sheet 23 and wire mesh 14, which pass thereover. A lower coating of molten glass will be drawn from this mass 24, against the lower face of the wire mesh 14, thus producing beyond the roll 19, a sheet 25 of substantially twice the thickness of the initial sheet 23, with the wire mesh 14 embedded at its center. A series of heating chambers, such as 26, 27 and 28, direct their heat downward through openings 29 upon the upper surfaces of sheets 23 and 25, which are also heated from below by the radiant heat from the molten glass in the draw pot. The sheets are thus maintained in a highly heated condition to insure their union beyond the roll 19, in the form of a single sheet. The sheet 25 is supported between the roll 19, and the drawing mechanism 20 (which preferably grips the sheet at its edge portions only), on a series of cooled rollers 30. A deflector 31 serves to direct the heated gases from chamber 7, passing through ports 32 and 33, as well as the heat from the far end of the drawpot, against the lower side of the sheet 25 just beyond the roller 19, to assist in flattening the sheet at this point, and also help to insure the union of the lower layer of plastic glass to the original sheet 23.

In starting the operation, the procedure is somewhat the reverse of that already described. By means of a bait, the mass of glass 24 is first drawn up over the roller 19, and a thin sheet of glass is drawn off through the drawing mechanism from this mass 24. Another bait is then employed to draw a mass of glass 22 up over the roll 18, from which sheet 23 is drawn which passes over the roll 21 and combines with the wire mesh 14, fed up through slot 11. When this sheet 23 is passed over the sheet already being drawn from mass 24 it adheres thereto, and the lower sheet, first started, soon loses its identity and becomes simply a lower coating of glass drawn onto the under side of sheet 23, and enclosing the wire mesh 14. The union takes place directly over the roll 19, there being during the normal operation but one sheet of glass 23, which, with the wire mesh 14, acts as a sort of bait to draw onto itself from the molten mass 24, a lower layer of glass forming the completed sheet of wire-glass 25.

It will be noted that in this system of drawing wire glass the sheet is not bent about a roller after the wire has been added thereto. If a sheet of wire glass with the wire mesh already centered therein is sufficiently plastic to be bent about a roller from one plane to another, there is a tendency during this stretching process for the less extensible wire mesh to be drawn through the lower half of the sheet toward the roller so that the wire will not be properly centered in the sheet after the sheet has been deflected into the new plane. In the present system, the wire mesh and each half of the glass sheet are bent separately and independently into the horizontal plane and there united. After this union takes place the sheet is not again deflected about any roller and the wire will remain properly centered between the two halves of the sheet.

In the modification shown in Fig. 3, the wire mesh 14, after passing over the guide roll 34, which is mounted lower than the roll 21 in the form first described, and rotates in the opposite direction, is passed back under roll 18, below the sheet 23. In this way a positive union between the wire mesh and the sheet 23 is insured. The operation after this sheet is drawn over the second roll 19 is the same as already described.

Figure 3:
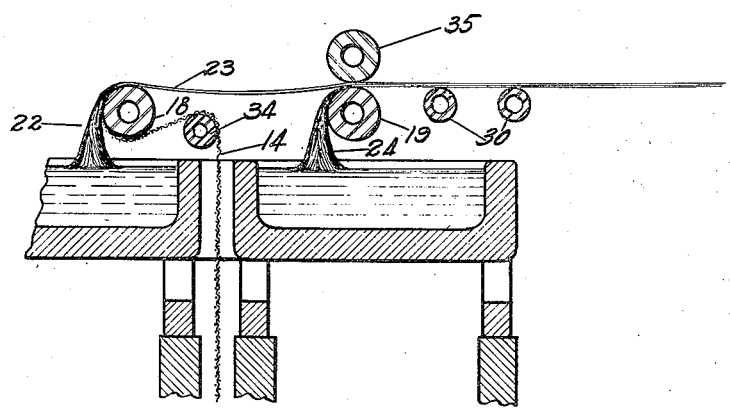
Fig. 3 is a partial longitudinal section through a modification.

In Fig. 3, an additional cooled roller 35, has been shown, adjustably mounted directly above the roller 19. By drawing the sheet between the two rollers 35 and 19, the additional pressure thus applied will positively insure the union of the two drawn glass portions. With proper heat conditions this roller 35 will not be necessary, but the use of a cooled polished roller at this point will not seriously injure the fire polished surface of the sheet. This additional roller will be particularly useful in producing the thinner grades of wire-glass.

Also, by suitably corrugating or figuring the surface of the roller 35, or the roller 19, or both, corrugated wire glass may be produced. The method of mounting and operating such corrugated rolls may be the same as clearly set forth in my copending application, Serial Number 442,379, filed of even date herewith.

It is to be understood that the upper roller 35, could if desired, be used with the modification shown in Figs. 1 and 2, as well as the form shown in Fig. 3.

Claims:

1. The method of making wire glass by separately drawing upwardly and then horizontally, the upper half of the sheet, the wire mesh, and the lower half of the sheet, and then bringing these parts into contact and uniting them to form a single sheet after each has been independently deflected into the horizontal plane.

2. The method of making wire-glass by drawing a thin sheet of glass horizontally from a mass of molten glass, and successively adding to this drawn sheet a sheet of wire mesh, and a second layer of molten glass at spaced points in the horizontal travel of the sheet.

3. The method of making wire-glass by drawing a thin sheet of glass horizontally from a mass of molten glass, and successively adding to the under side of the horizontally traveling sheet, a sheet of wire mesh and a covering layer of molten glass.

4. The method of making wire-glass by drawing the upper half of the sheet horizontally from one mass of molten glass, feeding in a sheet of wire mesh below this upper sheet portion and then drawing the lower half of the sheet from a second mass of molten glass over which the upper sheet portion and wire mesh pass.

5. In an apparatus for making wire-glass, a receptacle containing molten glass, a series of parallel horizontal rollers mounted in proximity to the molten glass, and means for drawing the sheet of wire glass horizontally over these rollers, the upper portion of the sheet, the wire mesh, and the lower portion of the sheet being successively drawn into the sheet.

6. In an apparatus for making wire-glass, a receptacle containing molten glass, a series of parallel horizontal internally cooled rollers mounted in proximity to the molten glass, and means for drawing the sheet of wire glass horizontally over these rollers, the upper portion of the sheet, the wire mesh, and the lower portion of the sheet being successively drawn into the sheet.

7. In an apparatus for making wire-glass, a receptacle containing molten glass, a series of parallel horizontal rollers mounted closely above the molten glass, and means for drawing a sheet of wire glass horizontally over these rollers, the two layers of the sheet being drawn from raised masses of molten glass over separate rollers, and the wire mesh being drawn in under the upper layer before the lower layer is added.

8. In an apparatus for making wire-glass, a receptacle containing molten glass, a series of internally cooled horizontal rollers mounted closely above the molten glass, and means for drawing the sheet of wire glass horizontally over these rollers, the two layers of the sheet being drawn from raised masses of molten glass over separate rollers, and the wire mesh being drawn in under the upper layer before the lower layer is added.

9. In an apparatus for making wire-glass, a receptacle containing molten glass, and a series of three spaced horizontal rollers mounted in proximity to the molten glass with their upper surfaces lying in substantially the same horizontal plane, and means for drawing a sheet of wire glass horizontally, the upper and lower halves of the sheet being drawn from masses of molten glass passing up over the two outer rollers respectively and the wire mesh being drawn up over the intermediate roller.

10. An apparatus for making wire-glass comprising, a receptacle containing molten glass, a pair of spaced cooled cylindrical rollers mounted in proximity to the molten mass, means for drawing a sheet of glass horizontally from masses of molten glass pulled up over these two rollers, the upper half of the sheet being formed from the glass drawn over the first roller and the lower half of the sheet being formed from the glass drawn over the second roller and means for feeding wire mesh into the sheet between the two rollers.

11. An apparatus for making wire-glass comprising, a receptacle containing molten glass, a pair of spaced horizontal cylindrical rollers mounted closely above the molten mass, means for drawing a sheet of glass horizontally from masses of molten glass drawn up over these rollers, the thin sheet drawn from the first roller passing over the second roller and uniting with the second mass of molten glass to produce a sheet of double thickness, and means for feeding a sheet of wire mesh under the first thin sheet before it is united with the second molten mass.

12. An apparatus for making wire-glass comprising, a receptacle containing molten glass, a cooled cylindrical roller mounted closely above the surface of the molten glass, a portion of the molten mass being constantly pulled up over this roller and drawn off horizontally in sheet form, a second cooled roller mounted parallel with the first mentioned roller and over which the sheet passes horizontally, a second mass of molten glass being drawn from the receptacle between the sheet and the second roller, and means for feeding a sheet of wire mesh between the sheet and the second sheet-forming mass of glass, the second mass of glass forming a new lower surface on the sheet, enclosing the wire mesh.

13. An apparatus for making wire-glass comprising, a receptacle containing molten glass, a pair of spaced parallel cylindrical cooled rollers mounted closely above the surface of the molten glass, means for feeding up a sheet of wire mesh at a point between the rollers, and a third roller intermediate the other two over which this wire is bent, a drawing mechanism for drawing up a mass of molten glass over each of the first rollers, and drawing a sheet horizontally from these masses, the sheet from one roller passing first over the intermediate roller and uniting with the wire, and then over the second roller and uniting with the glass drawn from the second mass of molten glass, to form a sheet of glass with the wire embedded therein, and means for directing heat against both faces of the sheet to insure the union of the several constituent parts.

Signed at Toledo, in the county of Lucas and State of Ohio, this 2d day of February, 1921.

JOSEPH P. CROWLEY.